Sept. 30, 1958     C. F. BACHLE     2,854,210
REVERSIBLE TURBINE

Filed Dec. 22, 1955     3 Sheets-Sheet 1

INVENTOR.
CARL F. BACHLE
BY
*Hauker Hardesty*
ATTORNEYS

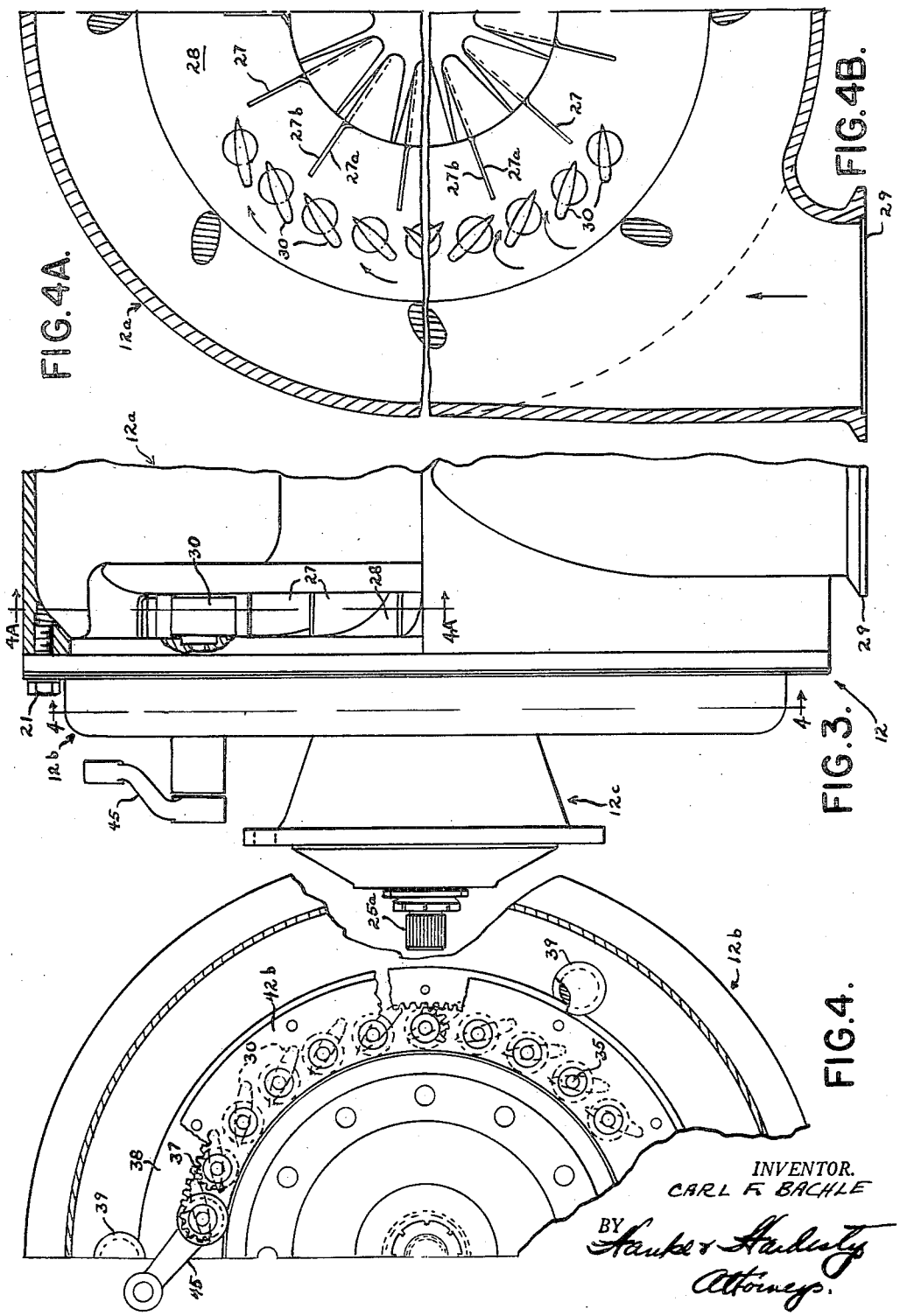

Sept. 30, 1958  C. F. BACHLE  2,854,210
REVERSIBLE TURBINE
Filed Dec. 22, 1955  3 Sheets-Sheet 3
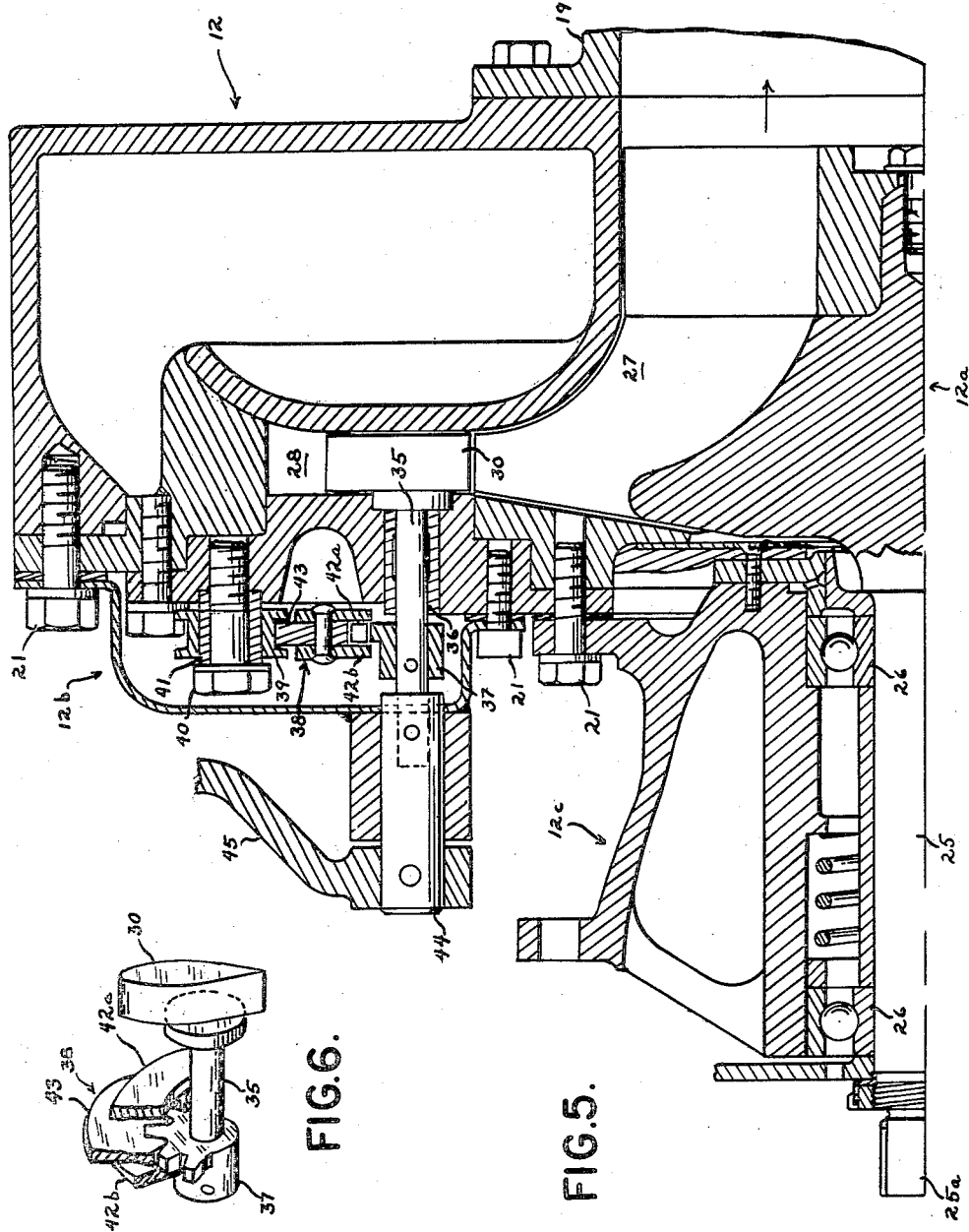
INVENTOR.
CARL F. BACHLE
BY
Hauke + Harderty
Attorneys

United States Patent Office 2,854,210
Patented Sept. 30, 1958

2,854,210

REVERSIBLE TURBINE

Carl F. Bachle, Grosse Pointe, Mich., assignor to Continental Aviation & Engineering Corporation, Detroit, Mich., a corporation of Virginia Application December 22, 1955, Serial No. 554,657

1 Claim. (Cl. 253—52)

This invention relates to turbine driven vehicles, embodying an assembly comprising a gas turbine drivingly connected to the transmission of the vehicle with a high pressure gas producer such as a free piston engine, and more particularly relates to a means for reversing the drive to the transmission by directionally altering the flow of gas against the turbine impeller blades to cause a reversing action of the turbine itself.

In heavy ordnance vehicles such as tanks, where space is at a premium, the trend of development has been to provide a more compact power plant capable of operating successfully under the necessary heavy loads experienced. Consequently, the combination of a free piston gas producer and a gas turbine is being utilized, the turbine being drivingly coupled to the vehicle transmission. The combination provides certain well-defined advantages over other combinations such as diesel engines with gas turbines. Advantages are decreased bulk and weight, practically the same average fuel consumption over the entire speed and power range, the opportunity for utilizing a wide range of fuels, lessened shock loads due to the absence of mechanical linkages such as piston rods and crankshafts, vibrationless performance, and the incorporation of increasing torque with decrease in R. P. M. In line with these overall advantages, it is desirable to incorporate a system for reversing the transmission in the simplest manner and without adding to the bulk or weight of the power package. This is accordingly accomplished by utilizing a braking and reversing means within the gas turbine.

An object of this invention is to provide an improved power plant by constructing an engine and transmission assembly incorporating an efficient reversing means through the use of a reversible gas turbine, thus eliminating the need for bulky and complex mechanical or hydraulic reversing transmissions as heretofore commonly used.

Another object of the invention is to accomplish the aforesaid reversing by providing a gas turbine drivingly connected with the vehicle transmission and reversible through controlling the direction from which the high pressure gas impinges the turbine blades.

A further object of the invention is to effect transmission reversal while maintaining weight and bulk at a minimum by providing a reversible gas turbine having stator vanes closely adjacent the turbine blades and selectively operable to direct gas flow against either side of the blades, causing a reverse rotation of the blades when the stator vane angle is reversed.

A still further object of the invention is to provide an improved vehicle drive by constructing a gas turbine for driving the transmission and having means for reversing the direction of gas flow against the turbine blades for the purpose of braking and/or reversing the vehicle motion.

For a complete understanding of the invention, reference may be had to the accompanying drawings illustrating a preferred embodiment of the invention in which like parts are referred to by like characters throughout the several views and in which:

Fig. 3 is a fragmentary side elevational view of the turbine, partially cut away to illustrate the operating mechanism.

Fig. 4 is a fragmentary sectional view taken on the line 4—4 of Fig. 3.

Fig. 4A is a fragmentary half-sectional view taken substantially on the line 4A—4A of Fig. 3, illustrating the reverse position of the turbine stator.

Fig. 4B is a view, similar to Fig. 4A, illustrating the forward position of the stator.

Fig. 5 is a cross-sectional elevational view on enlargement of part of the turbine of Fig. 2, and Fig. 6 is a fragmentary detail view in perspective of one of the reversible stator blades.

Figure 1:
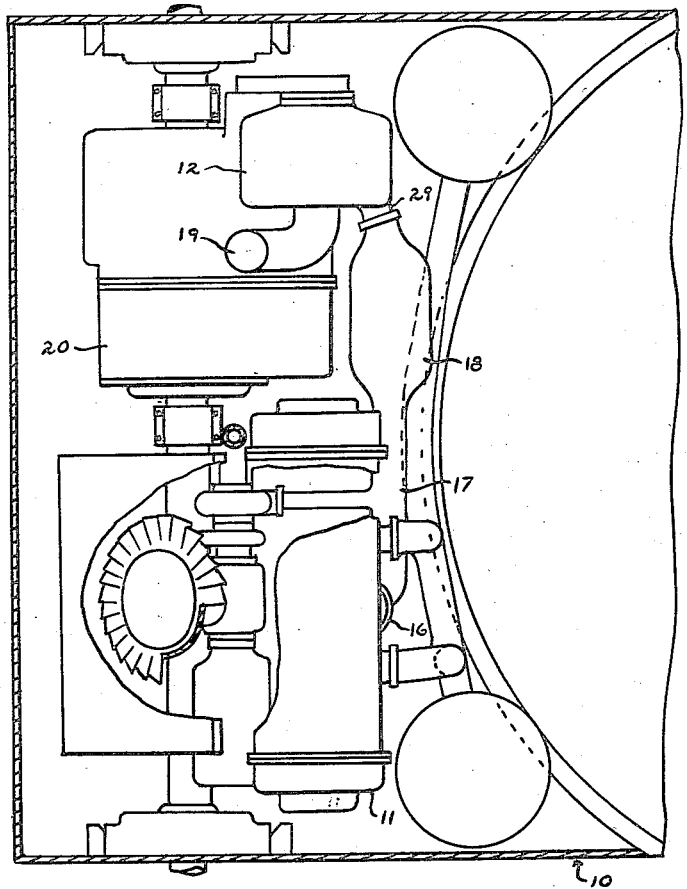
Fig. 1 is a top view of the rear section of a vehicle such as a tank illustrating one type of power plant installation having a combination of a free piston gas producer with a gas turbine drivingly connected to the vehicle transmission.
Figure 2:
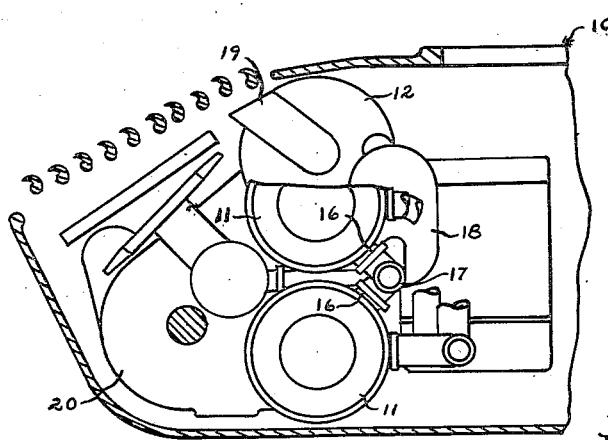
Fig. 2 is a fragmentary side view of the vehicle and components of Fig. 1.

Referring to Fig. 1, a vehicle 10 such as a tank is illustrated having all engine and transmission components compactly arranged in a rear section. The vehicle 10 has for a power source a horizontally disposed free piston engine 11, although multiple engines may be suitably interconnected and usually are. The free piston engine 11 is utilized to produce high pressure gas for the operation of a gas turbine assembly 12. The high pressure gas is exhausted from the free piston gas turbine through exhaust port 16 into a duct 17 leading to a reheater 18, where additional fuel is supplied and burned before entering the gas turbine assembly 12, and is then exhausted through exhaust pipe 19. The gas turbine assembly 12 is suitably adapted to drive a transmission 20.

The gas turbine assembly 12 comprises essentially three sections; namely, a turbine setion 12a, a reverse control section 12b, and a bearing support section 12c, the sections being secured together by bolts 21 or any other suitable means.

A rotor shaft 25 is rotatably supported by bearings 26 in the bearing support section 12c. The shaft 25 has a splined end 25a which is suitably adapted for driving engagement with the transmission 20. The other end of the shaft 25 supports turbine blades 27, which are adapted to rotate within a chamber 28 of the turbine section 12a.

The high pressure gas developed by the free piston gas producer 11 enters the chamber 28 through an intake 29, in a direction substantially tangential to the turbine blades 27 (see Fig. 4B). A ring of stator vanes 30 are arranged annularly and closely adjacent the turbine blades 27 for the purpose of positively directing the incoming gas flow inwardly against the turbine blades 27. In the forward position, illustrated in Fig. 4A, the vanes 30 are angularly positioned to cause only a slight deflection of the normal tangential gas flow, so that the gas impinges on the face 27a of the blades 27, rotating the blades, and consequently the driving shaft 25, in a clockwise direction. In the reverse position of the vanes, illustrated in Fig. 4B, the gas flow is forced to substantially reverse direction as indicated by the directional arrows, and impinges the face 27B of the blades 27, reversing the rotation of the blades, and consequently reversing the operation of said transmission.

As well as reversing the transmission, the turbine may be utilized as a transmission brake. By partially reversing the stator vanes 30, or by momentarily reversing same, the turbine wheel will be slowed down and the momentum of the vehicle and transmission moving parts may be effectively checked. Full braking may be accomplished by reversing the vanes 30 and simultaneously applying full power to the engines until the vehicle stops.

It will be noted that some of the kinetic energy of the incoming gas pressure flow will be lost due to the reversal of direction within the turbine. However, due to the closely spaced relation of the vanes, and also to the air foil structure embodied therein, the braking and reversal is accomplished in as smooth and efficient a manner as possible. The vanes 30 being also very close to the blades 27, the gas is directed against the blade faces in as close to normal direction as can be obtained, imparting the greatest rotational force possible in either direction. Thus, braking and reversing of the turbine is accomplished quickly and positively, and causes no strain on the transmission itself, regardless of the load. Increased load on the transmission results only in a greater time for reversal, which in any event is as short a time as is usually obtained by other reversal means.

Referring more particularly to Figs. 5 and 6, actuation of the vanes 30 is accomplished by the mechanism contained in the section 12b of the turbine assembly 12. Each vane 30 is mounted on one end of a shaft 35, which is supported as at 36 and extends into the section 12b. A gear 37 is secured to the other end of the shaft 35. An annular rack assembly 38 is in meshing engagement with all of the vane shaft gears 37, and is supported on its peripheral edge by rollers 39 rotatably secured in the section 12c by bolts 40 and spacer bearings 41 or other suitable means. The rack assembly 38 is composed of two annular guide rings 42a and 42b and the rack member 43, all riveted or otherwise secured together. The guide rings 42a and 42b ride on either side of the cogs of the gears 37, retaining lateral alignment of the gear and rack.

One gear 37 has an extended shaft portion 44 which extends outside the section 12b and a lever 45 is secured thereto, for the purpose of manually operating the reversing mechanism. In operation, movement of the lever 45 rotates its associated gear 37, which in turn rotates the rack assembly 38 to actuate all the other gears 37 substantially simultaneously. Thus the vanes 30 are rapidly rotated from one position to the other, changing the direction of gas flow against the turbine blades 27 as described above.

The expended gas, after impelling the blades 27, passes inwardly and is exhausted through the turbine exhaust pipe 19.

Although I have illustrated and described but one preferred embodiment of the invention, it will be apparent to those skilled in the art to which this invention pertains that various changes and modifications may be made therein without departing from the spirit of the invention or the scope of the appended claim.

I claim:

A gas pressure operated turbine assembly comprising a housing structure having a wall provided with an external substantially flat mounting surface, a turbine rotor mounted in said housing structure, a power take-off shaft extending through said wall and axially outwardly from said mounting surface, a support housing mounted on said plane mounting surface and rotatably supporting said power take-off shaft, said housing structure having an annular gas inlet chamber arranged to direct gas flow against said turbine rotor, and a plurality of stator vanes adjustably carried by said housing structure intermediate said turbine rotor and said inlet chamber and selectively operable to vary the angular deflection of gas against said turbine wheel, said vanes each having a shaft extending through said wall and axially outwardly from said mounting surface, said shafts being annularly spaced around said support housing, each of said shafts having a gear disposed outwardly of said mounting surface, an annular rack member spaced outwardly of said mounting surface and having internal gear teeth engaged with said vane shaft gears, guide means mounted on said mounting surface and rotatably supporting only the outer peripheral edge of said rack member, said rack member and guide means being disposed radially outwardly of said vane shafts, an annular cover box housing mounted on said mounting surface and enclosing said gears, rack member, and guide means, one of said vane shafts extending through said cover box and rotatably supported thereby, and an operating means connected to the outer end of the last mentioned shaft for directly adjusting the vane thereof, the other vanes being indirectly simultaneously adjusted by means of said rack member being rotated by the directly adjusted vane, said guide means comprising a plurality of rotatable roller members arranged in annularly spaced relationship around the periphery of said rack member and each having inner and outer shoulders engaged with opposite faces of said rack member for retaining same in a plane normal to the axes of said vane shafts, said rack member having inner and outer radially inwardly extending guide elements constructed and arranged to engage with opposite faces of said gears for retaining said rack member and said gears in a common plane against relative lateral displacement.

References Cited in the file of this patent

UNITED STATES PATENTS

| | | |
|---|---|---|
| 1,701,539 | Morrill | Feb. 12, 1929 |
| 1,990,872 | Lacy | Feb. 12, 1935 |
| 2,189,252 | Reggio | Feb. 6, 1940 |
| 2,733,853 | Trumpler | Feb. 7, 1956 |
| 2,770,943 | Beale | Nov. 20, 1956 |

FOREIGN PATENTS

| | | |
|---|---|---|
| 153,698 | Australia | Oct. 19, 1952 |